United States Patent
Bauerfeind et al.

(10) Patent No.: US 7,107,379 B2
(45) Date of Patent: Sep. 12, 2006

(54) METHOD FOR CONNECTING AN EXPANSION MODULE TO A PROGRAMMABLE ELECTRIC SWITCHING DEVICE

(75) Inventors: Dieter Bauerfeind, Bonn (DE); Olaf Dung, Hennef (DE)

(73) Assignee: Moeller GmbH, Bonn (DE)

( * ) Notice: Subject to any disclaimer, the term of this patent is extended or adjusted under 35 U.S.C. 154(b) by 610 days.

(21) Appl. No.: 09/947,333

(22) Filed: Sep. 5, 2001

(65) Prior Publication Data

US 2002/0073266 A1 Jun. 13, 2002

(51) Int. Cl.
*G06F 13/00* (2006.01)

(52) U.S. Cl. .............................. 710/300; 710/17; 710/38
(58) Field of Classification Search ...................... 710/8, 710/10, 17, 38, 63, 110, 300–304, 316; 716/17
See application file for complete search history.

(56) References Cited

U.S. PATENT DOCUMENTS 6,016,523 A * 1/2000 Zimmerman et al. ......... 710/63
6,536,029 B1 * 3/2003 Boggs et al. ................. 716/17

FOREIGN PATENT DOCUMENTS

| DE | 3828916 | 3/1990 |
|---|---|---|
| DE | 19629055 | 5/1998 |
| DE | 198 12 423 | 9/1999 |
| EP | 0 434 986 | 7/1991 |
| EP | 0464987 | 1/1992 |
| EP | 0608253 | 12/1997 |
| EP | 0774136 | 6/1998 |

OTHER PUBLICATIONS

"Main Catalogue 1999/2000 Automation and Power Distribution", pp. 01/004–01/005 & 05/006–05/007, Moeller Vertrieb International GmbH, Kloeckner–Moeller GmbH, 1998.

* cited by examiner

*Primary Examiner*—Khanh Dang
(74) *Attorney, Agent, or Firm*—Darby & Darby

(57) ABSTRACT

A method for connecting an expansion module to a programmable electric switching device includes initiating a recognition mode within the switching device during which an interrogation is carried out as to whether or not the connected expansion module is initializable. If the expansion module is not initializable, no data is exchanged between the switching device and the expansion module. If the expansion module is initializable, the switching device switches into an expansion communication mode in which data exchange takes place under the control of the operating system of the expansion module.

9 Claims, 2 Drawing Sheets

METHOD FOR CONNECTING AN EXPANSION MODULE TO A PROGRAMMABLE ELECTRIC SWITCHING DEVICE

BACKGROUND

The present invention relates to a method for connecting an expansion module to a programmable electric switching device.

Such switching devices may include, for example, small control systems, control relays or the like. It is common to all switching devices that they have a processing unit, for example, in the form of a microprocessor, an integrated display unit as well as an integrated operating control unit.

A programmable control relay of this kind including integrated arithmetic, operating control and display units is already known from the main catalog "Automatisieren und Energie verteilen '99" [Automation and Power Distribution '99] (pages 05/006–05/007) of the Klöckner-Moeller GmbH Company. These devices are applicable for minor control tasks in the field of domestic installations as well as in the construction of control cabinets and in mechanical and apparatus engineering. In lieu of the conventional wiring technique of individual components such as auxiliary contactors, relays or counter modules, the desired functions are "wired" (programmed) in the control relay using software. The programming is preferably carried out in circuit diagram representation.

Moreover, programmable control systems (for example, compact control systems) are known which can be expanded in their functionality via so-called "expansion modules" (main catalog of Klöckner-Moeller GmbH Company; "Automatisieren und Energie verteilen '99" [Automation and Power Distribution '99] (pages 01/004–01/005).

Switching devices such as those described above are at present very limited in their expandability. If the intention is for a basic device to be expanded with an expansion module, it is required that the expansion module exist in kind of a "table including connectable expansion modules" in the current operating system of the basic device. The device, which is already known to the basic device, is then selected and thus added to the functionality of the basic device. To make these programmable switching devices such as programmable control systems, logic relays and the like compatible for future expansion modules, the application software and the specific operating system including the above mentioned table must be updated at the particular time. For this, new hardware and software drivers have to be developed. New expansion modules cannot be used until the control system has been updated.

SUMMARY OF THE INVENTION

An object of the present invention is to provide a method for connecting an expansion module to a programmable electric switching device which ensures the compatibility of a basic device for non-implemented functions and standards.

The present invention provides a method for connecting an expansion module to a programmable electric switching device, the switching device including a processing unit, a display screen, an operating control unit and signal inputs and signal outputs as well as a data interface; and the processing unit, the display screen, the operating control unit, the signal inputs, and the signal outputs as well as the data interface being accommodated in a common housing; and switching functions being programmable by the user via a menu-driven user interface on the display screen, and the programmable switching device switching the current flow between the signal inputs and the signal outputs under the control of a user program and as a function of the state of the signal inputs; and the expansion module including a processing unit and a data interface which are accommodated in a common housing; and the switching device and the expansion module being interconnected via their data interfaces for exchanging data, the method including the following method steps: initiation of a recognition mode within the switching device during which an interrogation is carried out as to whether or not the connected expansion module is initializable; if the expansion module is not initializable, no data is exchanged between the switching device and the expansion module; if the expansion module is initializable, the switching device switches into an expansion communication mode in which the further data exchange takes place under the control of the operating system of the expansion module.

Using a communication system (basic device with connectable "known" expansion module) of the type mentioned at the outset, according to the present invention the switching device and the expansion module are configured in such a manner that, subsequent to connecting the expansion module to the switching device, a recognition mode is initiated within the switching device during which an interrogation is carried out as to whether or not the connected expansion module is initializable. If the expansion module is not initializable, no data is exchanged between the switching device and the expansion module; if the expansion module is initializable, the switching device switches into an expansion communication mode in which the further data exchange for the initialization and, possibly, the configuration of the expansion module, are carried out under the control of the operating system of the expansion module. In the course of the initialization, the operating data required for the operation of the device combination (basic device with expansion module) such as the device identifier for the basic device and the functional profile is exchanged in an appropriate data structure. During the configuration of a configurable expansion module, necessary data such as the station address, data rate and, possibly, variable parts from the functional profile of the expansion module are supplemented or updated.

In an embodiment of the present invention, the switching device is automatically switched into a remote mode through the connection of an expansion module. Alternatively, the remote mode can also be manually selected by the user via a menu item "REMOTE ON" on the user interface. By selecting "REMOTE ON", the processing unit (CPU) of the switching device will be controlled by the processing unit of the connected expansion module from this time on.

If an initializable expansion module is identified at the device interface of the switching device which is intended for this, the expansion module is initialized. In a further step of the method, it is interrogated (via the operating system of the switching device) whether or not the initializable expansion module is configurable as well.

If the connected module is not configurable (for example, a module for expanding the inputs and outputs by n × inputs and m × outputs), the entire data exchange required can be carried out fully automatically. Advantageously, the data exchange is completely controlled by the expansion module.

To this end, a controlled data exchange takes place between the two devices under the control of the processing unit of the expansion module. The expansion module transmits at least its minimum configuration data required for a basic functionality to the switching device.

If the connected expansion module is configurable (for example, a module for expanding the inputs and/or outputs by n × inputs and/or m × outputs, the inputs and outputs being commutable or definable by configuration), the processing unit of the switching device acts as an MMI (man-machine interface), providing appropriate services for display output and keyboard entry.

BRIEF DESCRIPTION OF THE DRAWINGS

The present invention will be elaborated upon below on the basis of exemplary embodiments with reference to the drawings.

DETAILED DESCRIPTION

Figure 1:
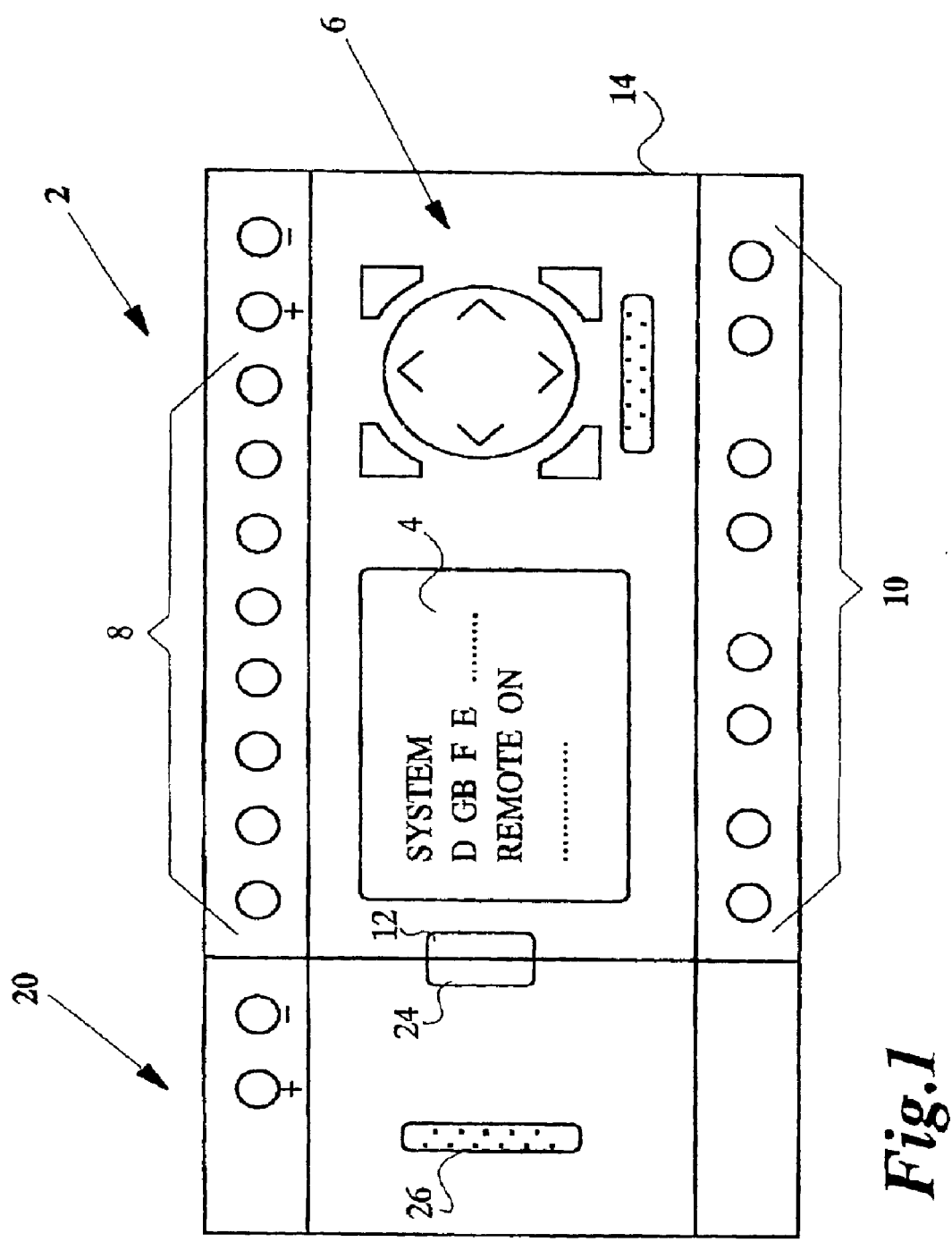
FIG. 1 shows schematic representation of a communication system for carrying out the method according to the present invention, including a switching device with a connected expansion module.

FIG. 1 shows a communication system for carrying out the method according to the present invention. The communication system includes a programmable electric switching device 2 having a processing unit, a display screen 4, an operating control unit 6, signal inputs 8 and signal outputs 10, and a data interface 12. In this context, the processing unit, display screen 4, operating control unit 6, signal inputs 8, and signal outputs 10 as well as data interface 12 are accommodated in a common housing 14. In this connection, the switching functions can be programmed by the user via a menu-driven user interface on display screen 4. Programmable switching device 2 then switches the current flow between signal inputs 8 and signal outputs 10 under the control of a user program programmed by the user and as a function of the state of signal inputs 8.

Moreover, the communication system includes an expansion module 20 having a processing unit and a data interface 24 which are accommodated in a common housing 22. Switching device 2 and expansion module 20 are mechanically and electrically interconnected via their data interfaces 12, 24. According to the present invention, switching device 2 and expansion module 20 are designed in such a manner that, subsequent to connecting expansion module 20 to switching device 2, a recognition mode is initiated within switching device 2 during which an interrogation is carried out as to whether or not connected expansion module 20 is initializable. If expansion module 20 is not initializable, no data is exchanged between switching device 2 and expansion module 20 (the module is ignored as a "foreign device"); if expansion module 20 is initializable, switching device 2 switches into an expansion communication mode in which the further data exchange takes place under the control of the operating system of expansion module 20.

In an embodiment of the present invention, switching device 2 is switched into a remote mode when expansion module 20 is connected. This remote mode can be freely selected by the user via a menu item "REMOTE ON" on the user interface. By selecting "REMOTE ON", the processing unit (CPU) of switching device 2 will be controlled by the processing unit of connected expansion module 20 from this time on.

If an initializable expansion module 20 is identified at device interface 12 of switching device 2, the expansion module 20 is interrogated (via the operating system of the switching device) in a further step of the method, as to whether or not initializable expansion module 20 is configurable as well.

If connected module 20 is not configurable, the further data exchange (initialization and, possibly, minimum configuration) can be carried out fully automatically. The communication required for this is completely controlled by expansion module 20 itself. To this end, a controlled data exchange takes place between the two devices 2, 20 under the control of the processing unit of expansion module 20.

If connected expansion module 20 is configurable, it acts as an MMI (man-machine interface), providing appropriate services for display output and keyboard entry in that, in the expansion communication mode, the processing unit of switching device 2 is controlled by the processing unit of expansion module 20 in such a manner that operating control unit 6 and display screen 4 of switching device 2 are functionally decoupled from the switching device and coupled to expansion module 20. To enable input values of keyboard 6 to be transmitted from switching device 2 to connected expansion module 20, editors are needed which are able to transmit values such as integer values or time-of-day values to expansion module 20. All configurable expansion modules 20 may be configured via a set of basic services, as follows:

CLEAR DISPLAY prepares a character output;

SET CURSOR positions the cursor within the display field;

OUTPUT CHARACTER writes an ASCII character at the instantaneous cursor position and increments this character;

GET INTEGER VALUE awaits the acceptance of the value adjusted in the display (acceptance is, for example, by actuating an enabling key); and REMOTE OFF exits the configuration mode.

In this manner, it is possible to implement the entry of address, baud rate and other parameters in the integer range.

During the initial operation of the communication system, the bus address or identity number of expansion module 20 are stored in a storage unit (for example, EEPROM) thereof for initializing and, possibly, configuring the expansion module. The bus address and identity number have to be transferred from the processing unit of expansion module 20 to the processing unit of switching device 2 in the expansion communication mode. For this, a remote server functionality is implemented in the processing unit of switching device 2, enabling appropriate services, for example, for inputting a station address of connected expansion module 20 or for inputting parameters for the expansion module via operating control unit 6 of switching device 2 and for displaying the address or parameters, which have been input, on display screen 4 of switching device 2.

For the application case that the intention is to implement the connection of switching device 2 to a bus system, such as Profibus, via expansion module 20, expansion module 20 features a corresponding interface 26 as well as a software device for communication and connection to the bus system. During the operation of the communication system, a cyclic data exchange is then carried out between the Profibus and the processing unit of expansion module 20.

Figure 2:
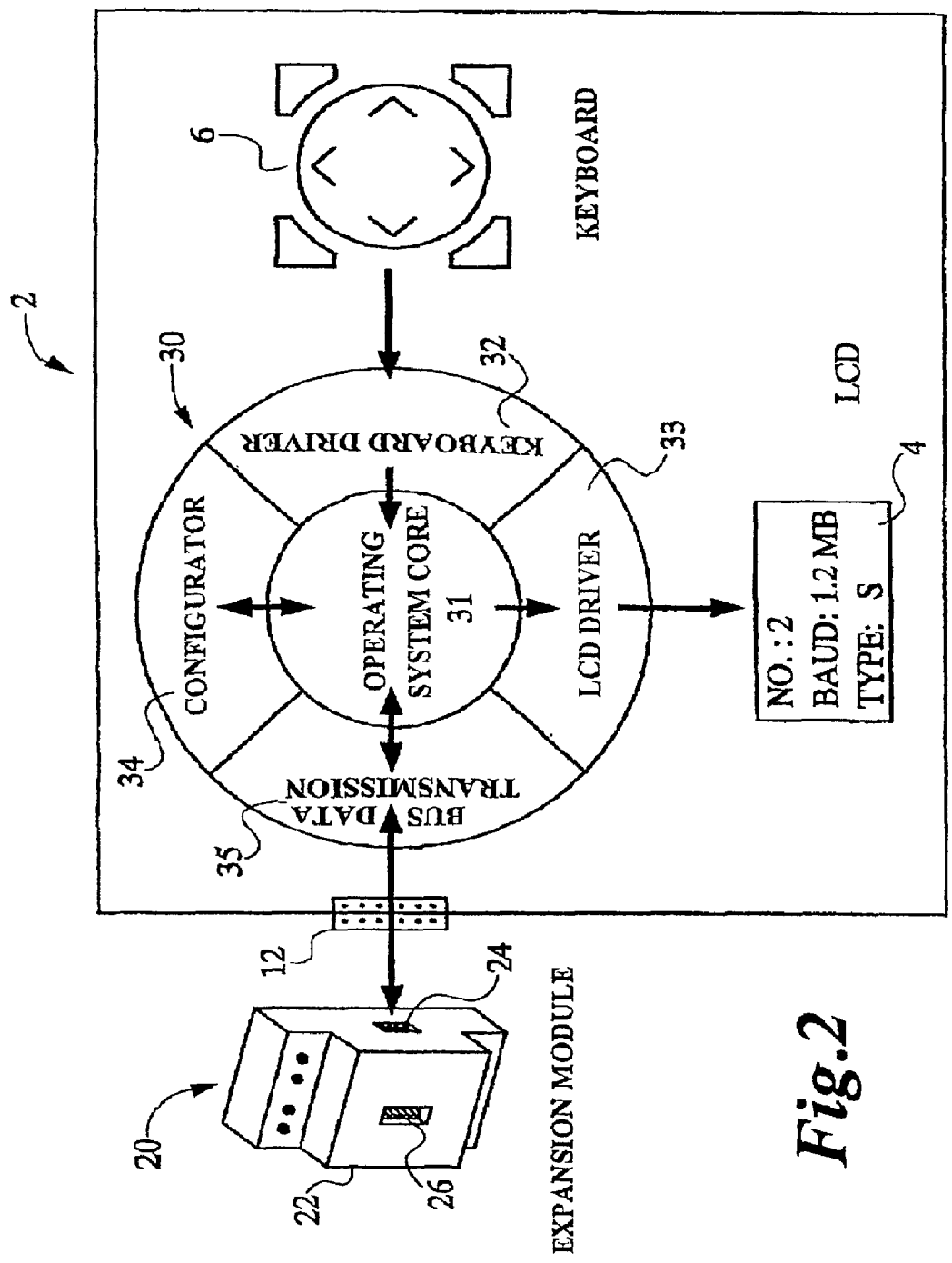
FIG. 2 shows an embodiment of a switching device combination according to FIG. 1.

FIG. 2 shows a schematic representation of the functional connection of expansion module 20 to switching device 2. In this context, operating system 30 is advantageously provided with an operating system core 31 for the coordination and execution of standard functions of switching device 2 and with several driver parts 32, 33 for the data coordination of input unit 6 and display unit 8. According the present invention, operating system 30, moreover, has a configurator part 34. This configurator part 34 interacts with operating system core 31 in such a manner that a communication with connected expansion module 20 is possible via device interface 12, and that data of expansion module 20 may be changed and/or input therein via input unit 6, and that this process may be displayed via display unit 4. In this mode of operation, with control being via configurator part 34, operating system core 31 of switching device 2 only feeds through the data from input unit 6 of switching device 2 to external expansion module 20 and from expansion module 20 to integrated display unit 8 of switching device 2.

If an expansion device 20 is connected to switching device 2, then expansion module 20 is recognized by operating system 30 of switching device 2 as soon as switching device 2 is energized and the remote mode is selected. If expansion module 20 has not yet been initialized by switching device 2, the system is blocked and cannot go into the operating state "RUN". A subitem "REMOTE ON" appears on the start menu of switching device 2. If subitem "REMOTE ON" is selected, an initialization run is started by operating system 30 (data string is transmitted to expansion module 20). Thereupon, configurator part 34 of operation system 30 of switching device 2 receives a data string for display unit 4 from expansion module 20. From this time on, expansion module 20 takes over the control of display unit 4 and the interrogation of input unit 6 via configurator part 34 of switching device 2. The data string transmitted by expansion module 20 contains user information in plain text on required inputs and makes available the input masks needed for the input. Thus, configurator part 34 of operating system 30 of switching device 2 acts as a data pass-through of expansion module 20. In this context, data checks such as value range checks and plausibility checks are incumbent upon expansion module 20 alone.

According to the present invention, the entire functionality of new expansion module 20 and the required initialization data are present in expansion module 20. Using this embodiment of the present invention, it is also possible for future expansion modules 20 to be coupled to switching devices 2. As a result, a switching device 2 of today can later be coupled, for example, to a bus interface developed at a later time.

What is claimed is:

1. A method for connecting an expansion module to a programmable electric switching device, the method comprising:

interconnecting the switching device and the expansion module via a first data interface of the switching device and second data interface of the expansion module;

initiating a recognition mode in the switching device, an interrogation as to whether or not the expansion module is initializable being performed during the recognition mode;

when the expansion module is not initializable, exchanging no data between the switching device and the expansion module; and when the expansion module is initializable, switching the switching device into an expansion communication mode, a data exchange being performed under a control of an operating system of the expansion module during the communication mode.

2. The method as recited in claim 1 wherein:

the switching device further includes a first processing unit, a display screen, an operating control unit, a plurality of signal inputs, and a plurality of signal outputs;

switching functions of the switching device are programmable by a user via a menu-driven user interface on the display screen;

the programmable switching device is capable of switching a current flow between the plurality of signal inputs and the plurality of signal outputs under a control of a user program and as a function of a state of the plurality of signal inputs; and the expansion module further includes a second processing unit.

3. The method as recited in claim 2 further comprising:

disposing the first processing unit, the display screen, the operating control unit, the plurality of signal inputs, the plurality of signal outputs and the first data interface in a first housing; and disposing the second processing unit and the second data interface in a second housing.

4. The method as recited in claim 2 wherein the expansion module is initializable and further comprising:

interrogating as to whether or not the expansion module is configurable; and when the expansion module is configurable, controlling the first processing unit using the second processing unit in the expansion communication mode so as to enable the operating control unit and the display screen to be functionally decoupled from the switching device and coupled to the expansion module.

5. A method for connecting an expansion module to a programmable electric switching device, the switching device including a first processing unit, a display screen, an operating control unit, a plurality of signal inputs, a plurality of signal outputs and a first data interface, switching functions of the switching device being programmable by a user via a menu-driven user interface on the display screen, the programmable switching device being capable of switching a current flow between the plurality of signal inputs and the plurality of signal outputs under a control of a user program and as a function of a state of the plurality of signal inputs, the expansion module including a second processing unit and a second data interface, the method comprising:

interconnecting the switching device and the expansion module via the first and second data interfaces for exchanging data;

initiating a recognition mode in the switching device, an interrogation as to whether or not the expansion module is initializable being performed during the recognition mode;

when the expansion module is not initializable, exchanging no data between the switching device and the expansion module; and when the expansion module is initializable, switching the switching device into an expansion communication mode, a data exchange being performed under a control of an operating system of the expansion module during the communication mode.

6. The method as recited in claim 5 further comprising: disposing the first processing unit, the display screen, the operating control unit, the plurality of signal inputs, the plurality of signal outputs and the first data interface in a first housing; and disposing the second processing unit and the second data interface in a second housing.

7. The method as recited in claim 5 wherein the expansion module is initializable and further comprising:

interrogating as to whether or not the expansion module is configurable; and when the expansion module is configurable, controlling the first processing unit using the second the processing unit in the expansion communication mode so as to enable the operating control unit and the display screen to be functionally decoupled from the switching device and coupled to the expansion module.

8. A method for connecting an expansion module to a programmable electric switching device, the switching device including a first processing unit, a display screen, an operating control unit, a plurality of signal inputs, a plurality of signal outputs and a first data interface, switching functions of the switching device being programmable by a user via a menu-driven user interface on the display screen, the programmable switching device being capable of switching a current flow between the plurality of signal inputs and the plurality of signal outputs under a control of a user program and as a function of a state of the plurality of signal inputs, the expansion module including a second processing unit and a second data interface, the method comprising:

disposing the first processing unit, the display screen, the operating control unit, the plurality of signal inputs, the plurality of signal outputs and the first data interface in a first housing;

disposing the second processing unit and the second data interface in a second housing;

interconnecting the switching device and the expansion module via the first and second data interfaces for exchanging data;

initiating a recognition mode in the switching device, an interrogation as to whether or not the expansion module is initializable being performed during the recognition mode;

when the expansion module is not initializable, exchanging no data between the switching device and the expansion module; and when the expansion module is initializable, switching the switching device into an expansion communication mode, a data exchange being performed under a control of an operating system of the expansion module during the communication mode.

9. The method as recited in claim 8 wherein the expansion module is initializable and further comprising:

interrogating as to whether or not the expansion module is configurable; and when the expansion module is configurable, controlling the first processing unit using the second the processing unit in the expansion communication mode so as to enable the operating control unit and the display screen to be functionally decoupled from the switching device and coupled to the expansion module.

\* \* \* \* \*

UNITED STATES PATENT AND TRADEMARK OFFICE
CERTIFICATE OF CORRECTION

PATENT NO. : 7,107,379 B2
APPLICATION NO. : 09/947333
DATED : September 12, 2006
INVENTOR(S) : Dieter Bauerfeind et al.

It is certified that error appears in the above-identified patent and that said Letters Patent is hereby corrected as shown below:

Please insert:
On Title Page, Item (30)
-- DE 100 43 841.5 Germany 6 September 2000 --.

Signed and Sealed this

Twelfth Day of December, 2006

JON W. DUDAS
*Director of the United States Patent and Trademark Office*